P. O. MORATZ.
CHILD'S VEHICLE.
APPLICATION FILED JUNE 4, 1919.
1,354,121.
Patented Sept. 28, 1920.
2 SHEETS—SHEET 1.
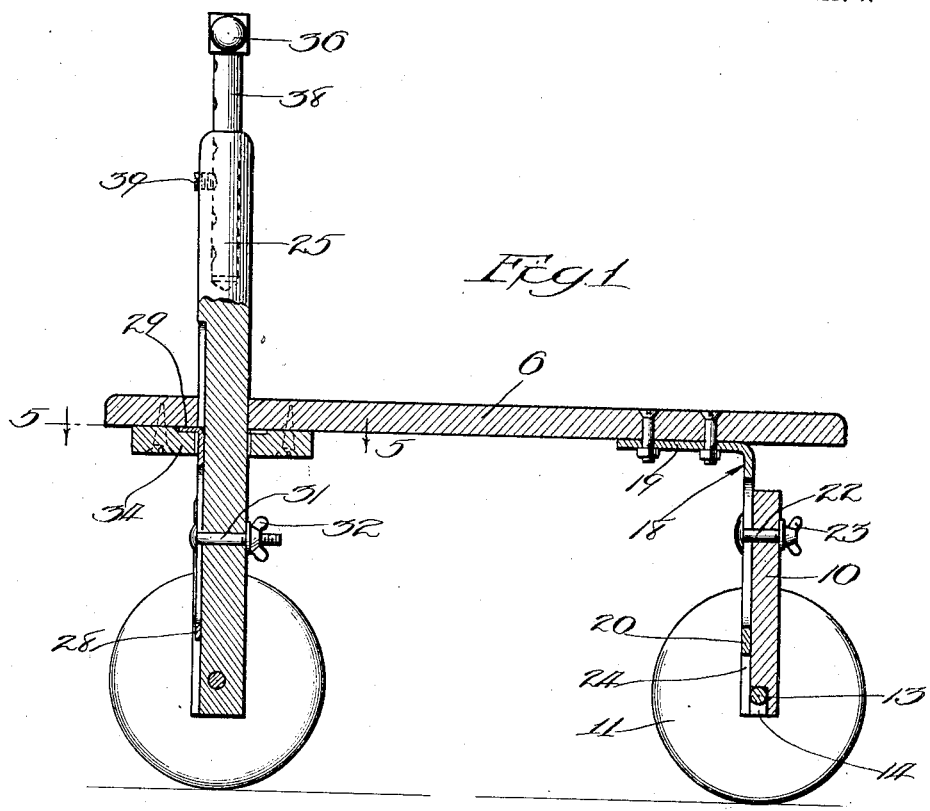
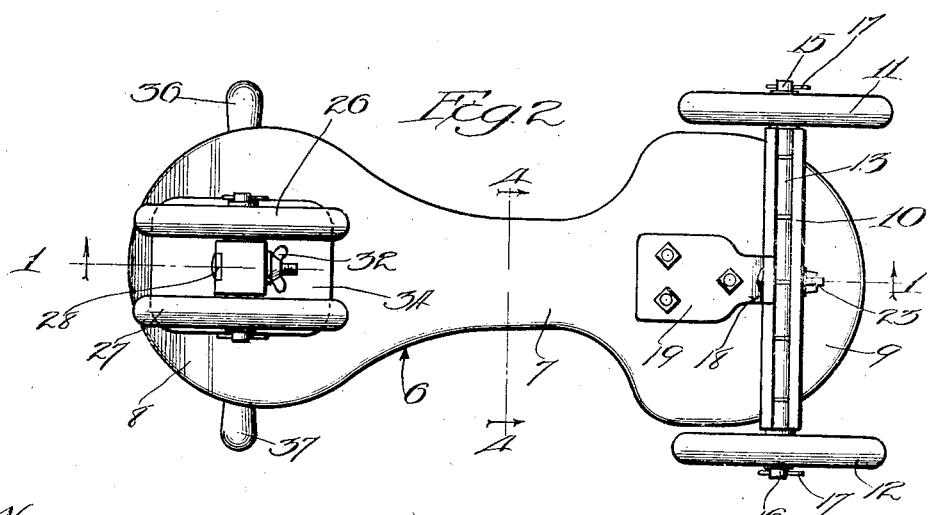
Witness:
Harry S. Gaither
Inventor:
Paul O. Moratz P. O. MORATZ.
CHILD'S VEHICLE.
APPLICATION FILED JUNE 4, 1919.
1,354,121.
Patented Sept. 28, 1920.
2 SHEETS—SHEET 2.
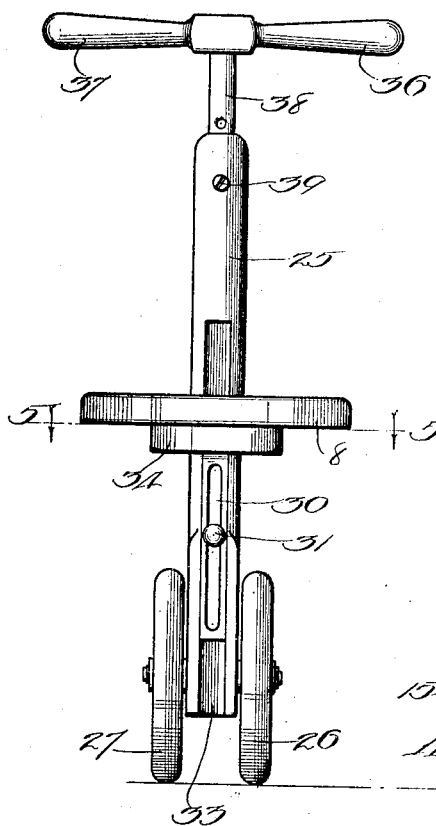
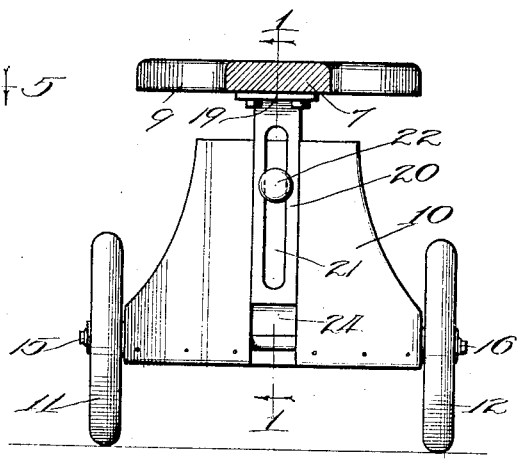
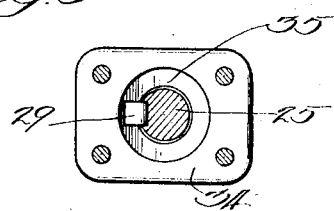
Witness:
Harry S. Gaither
Inventor:
Paul O. Moratz

UNITED STATES PATENT OFFICE.

PAUL O. MORATZ, OF BLOOMINGTON, ILLINOIS, ASSIGNOR TO B. COLEMAN SILVER, OF CHICAGO, ILLINOIS.

CHILD'S VEHICLE.

1,354,121. Specification of Letters Patent. Patented Sept. 28, 1920.

Application filed June 4, 1919. Serial No. 301,835.

*To all whom it may concern:*

Be it known that I, PAUL O. MORATZ, a citizen of the United States, residing at Bloomington, in the county of McLean and State of Illinois, have invented certain new and useful Improvements in Children's Vehicles, of which the following is a specification.

The present invention has to do with improvements in children's wheeled vehicles which are so constructed that the child may straddle them and then force them along the ground or pavement by working his legs on the ground, a steering handle being conveniently located in front of him for the control of the steering wheel. It is very desirable to so construct the device that the elevation of the platform or seat can be regulated or changed according to the size of the child, thus making it possible to adapt the vehicle to the needs and convenience of a growing child.

Another object of the invention is to so construct the device that the foregoing adjustments may be made by a direct movement of the wheels toward and from the platform as distinguished from a swinging or oscillating movement.

Another object of the invention is to provide a very simple construction of device and one which can be very cheaply manufactured from relatively few parts.

Other objects and uses of the invention will appear from a detailed description of the same which consists in the features of construction and combinations of parts hereinafter described and claimed.

Referring to the drawings:

Figure 1 shows a longitudinal section through a vehicle embodying the features of the present invention;

Fig. 2 shows a bottom view of the vehicle;

Fig. 3 shows a front view of the vehicle;

Fig. 4 shows a section taken on the line 4—4 of Fig. 2, looking in the direction of the arrows; and Fig. 5 shows a horizontal section taken on the line 5—5 of Fig. 3, looking in the direction of the arrows. Fig. 5 may also be considered as a section taken on line 5—5 of Fig. 1, looking in the direction of the arrows.

The vehicle comprises a platform 6 whose shape may be of any form suitable to the requirements of the child, but preferably includes the contracted central portion 7 in conjunction with the relatively enlarged end portions 8 and 9 respectively. The child straddles the central portion 7 and operates the vehicle by paddling his feet on the ground.

In the rear portion of the device is a truck block 10 on which are journaled the rear wheels 11 and 12, said wheels being journaled in any suitable manner, as, for example, by the use of an axle 13 set into a groove or recess 14 in the lower edge of the truck block 10. The wheels may be journaled on the projecting end portions 15 and 16 of said axle, being held in place thereon by the cotter pins or the like 17.

An angular bar 18 has its upper portion 19 secured to the block edges and its depending arm 20 in operative relationship to the truck block 10. Said depending arm 20 is longitudinally slotted as at 21, so that a bolt 22 passed through the slot 21 and provided with a wing nut or other clamping device 23 may be used for locking the truck block 10 in any desired position with respect to the arm 20. Ordinarily the arm 20 will work in a vertical groove 24 of the truck block, so that the truck block will be kept in proper relation with respect to the body block 6.

It will be observed from the foregoing description that the truck block may be adjusted back and forth in a direct manner with respect to the body block 6 and without any swinging or oscillating movement.

In the front portion of the block 6 is swiveled or pivoted a steering post 25 on the lower end of which is journaled one or more steering wheels 26 and 27. The post 25 passes through an opening in the front portion of the body block 6. An angular bar 28 has its upper end 29 bent or flanged over as shown in Fig. 1, and supports the lower surface of the block 6, the downwardly depending arm 28 lying against the steering post 25. Said downwardly depending arm 28 is slotted as shown at 30 in Fig. 1, so that by means of a bolt 31 and wing nut or other locking device 32 the arm 28 can be clamped with respect to the steering post 25 to retain the same in any vertically adjusted position.

Ordinarily the downwardly depending arm 28 will operate in a groove or slot 33 of the steering post so as to keep the parts properly alined.

With the arrangement thus far described, the angular bar will serve to support the front end of the body block 6 in any desired position of vertical adjustment, but in case the body block were to be lifted, the steering post 25 would drop down and away from the same. In order to hold the parts always in proper relationship, I have provided another block 34 secured to the lower face of the body block 6 and having a circular groove or slot 35 which accommodates the arm 29 of the bar 28. As the steering post is turned, the arm 29 will work in said circular slot.

On the upper end of the steering post is a bar of steering handles 36 and 37. These handles are mounted on the upper end of a pin 38 which is vertically adjusted in the steering post 25, and may be secured in any desired position of adjustment by means of a screw 39 or the like.

While I have herein shown and described only a single embodiment of the features of my invention, still I do not limit myself to the said embodiment except as I may do so in the claims.

I claim:

1. A child's vehicle comprising, in combination, a platform, a truck block in conjunction with the rear end thereof, a pair of supporting wheels journaled to said truck block, a steering post extending through the front portion of the platform and rotatable with respect thereto, a steering wheel on the lower end of said post, an angle bar having its vertical arm in coöperation with the steering post and its horizontal arm beneath and supporting the platform, means for clamping the vertical arm against the steering post in any desired position of adjustment, a retaining block surrounding the steering post and secured to the under face of the platform and having a circular recess for the accommodation of the horizontal arm of the angle bar, a pair of steering handles, and means for adjustably connecting said handles to the upper end of the steering post, substantially as described.

2. A child's vehicle comprising, in combination, a platform, supporting wheels journaled with respect to the rear end thereof, a steering post journaled with respect to the front end of the platform, a steering wheel journaled on the lower end of said post, an angle bar having its vertical arm in coöperation with the steering post and its horizontal arm beneath the front end of the platform and supporting the same, means for clamping the vertical arm against the steering post in any desired position of vertical adjustment, means for retaining the horizontal arm in coöperative position with respect to the platform, and a steering handle vertically adjustable with respect to the upper end of the steering post, substantially as described.

3. A child's vehicle comprising, in combination, a platform, supporting wheels for the rear end thereof, a steering post in conjunction with the front end thereof, a steering wheel on the lower end of the steering post, an angle bar having its vertical arm vertically adjusted with respect to the steering post and its horizontal arm beneath and serving to support the front end of the platform, means for retaining said horizontal arm in coöperative position with respect to the platform, and a steering handle in conjunction with the upper end of the steering post, substantially as described.

PAUL O. MORATZ.